(12) United States Patent
Cosentino et al.

(10) Patent No.: US 9,981,655 B2
(45) Date of Patent: May 29, 2018

(54) VEHICLE ANTI-ROLLOVER SYSTEM

(71) Applicant: CNH Industrial America LLC, New Holland, PA (US)

(72) Inventors: Giuseppe Cosentino, Modena (IT); Riccardo Morselli, Modena (IT); Stefano Fiorati, Poggio Renatico (IT)

(73) Assignee: CNH Industrial America LLC, New Holland, PA (US)

( * ) Notice: Subject to any disclaimer, the term of this patent is extended or adjusted under 35 U.S.C. 154(b) by 164 days.

(21) Appl. No.: 14/894,691

(22) PCT Filed: May 28, 2014

(86) PCT No.: PCT/EP2014/061135
§ 371 (c)(1),
(2) Date: Nov. 30, 2015

(87) PCT Pub. No.: WO2014/191496
PCT Pub. Date: Dec. 4, 2014

(65) Prior Publication Data
US 2016/0107641 A1    Apr. 21, 2016

(30) Foreign Application Priority Data
May 30, 2013  (IT) .............. M02013A0156

(51) Int. Cl.
*B60W 30/04*       (2006.01)
*B60G 9/02*        (2006.01)
(Continued)

(52) U.S. Cl.
CPC .............. *B60W 30/04* (2013.01); *B60G 9/02* (2013.01); *B60G 17/016* (2013.01);
(Continued)

(58) Field of Classification Search
CPC ....... B60W 30/04; B60G 9/02; B60G 17/016; B60G 17/019
See application file for complete search history.

(56) References Cited

U.S. PATENT DOCUMENTS

| 4,964,679 A | 10/1990 | Rath |
| 2005/0177296 A1* | 8/2005 | Brown ............... B62D 6/00 701/70 |
| 2008/0208416 A1 | 4/2008 | Yuet et al. |

FOREIGN PATENT DOCUMENTS

| EP | 2444304 | 4/2012 |
| EP | 2502766 | 9/2012 |

OTHER PUBLICATIONS

PCT International Search Report and Written Opinion for Application No. PCT/EP2014/061135 dated Jul. 3, 2014.

* cited by examiner

*Primary Examiner* — Basil T. Jos
(74) *Attorney, Agent, or Firm* — Rickard K. DeMille; Rebecca L. Henkel

(57) ABSTRACT

A work vehicle is provided having a first pair of wheels mounted to a vehicle body via a fixed axle and a second pair of wheels mounted to the vehicle body via a pivotable axle. The work vehicle includes an anti-rollover system with at least two load sensors mounted at an axle housing near different ones of the first pair of wheels to measure a downward force borne by each respective wheel, the at least two load sensors being operationally connected to a processor. The processor is configured to send anti-rollover commands to the anti-rollover system based on signals received from the at least two load sensors.

12 Claims, 3 Drawing Sheets

(51) Int. Cl.
*B60G 17/016* (2006.01)
*B60G 17/019* (2006.01)
(52) U.S. Cl.
CPC ........ *B60G 17/019* (2013.01); *B60G 2300/08* (2013.01); *B60G 2300/09* (2013.01); *B60G 2800/0124* (2013.01); *B60G 2800/9124* (2013.01)

VEHICLE ANTI-ROLLOVER SYSTEM

CROSS REFERENCE TO RELATED APPLICATIONS

This application is a national stage of PCT Application No. PCT/EP2014/061135, entitled "VEHICLE ANTI-ROLLOVER SYSTEM", filed on May 28, 2014, which claims priority from and the benefit of Italian Patent Application Serial No. MO2013A000156, filed on May 30, 2013. Each of the foregoing applications is hereby incorporated by reference in its entirety.

The present invention relates to a system and method for preventing rollover of work vehicles, in particular agricultural vehicles.

An agricultural vehicle is typically provided with wheels resting on the ground. The wheels are connected to the vehicle body via a front axle and a rear axle arranged transversely to the movement direction of the vehicle. The distribution of the weight of the vehicle on the axles varies according to use, the rest configuration on the ground, the implement connected to the vehicle, the load on board, both fixed and variable or movable, and only in a few operating circumstances it is constructionally predetermined.

In agricultural vehicles, the axles typically do not have shock-absorbing suspension means, but are rigid. Therefore, in an attempt to distribute the load as uniformly as possible on the ground between the wheels of the same axle, one of the two axles is rotateably (or pivotably) connected to the body of the vehicle, in such a manner as to be able to oscillate, i.e. rotate, with respect to a longitudinal axis of the vehicle. Thereby the pivotable axle is able to follow, at least partially, the unevenness of the ground, which would otherwise force the vehicle to rest irregularly on the ground, which would alter the loads of the wheels on the ground, until, for example, a wheel detaches from the ground.

In tractors the front axle is typically rotateably connected to the vehicle body because in general, the front axle bears less loads than the rear axle. In such configuration, the angular position of the vehicle is determined by the position of the rear axle, which is fixed with respect to the vehicle. The front axle can perform oscillations within a limited oscillation magnitude around the longitudinal axis of the vehicle. Thereby the front wheels are enabled to follow the unevenness of the ground, independently of the angular position of the vehicle which is determined by the unevenness of the ground.

In, e.g., a combine harvester the rear axle is typically pivotable and the front axle fixed. In the following, a tractor with an unsuspended pivotable front axle will be described and a fixed rigid rear axle will be used as an example. It is, however, to be noted that the problems and solutions described are similarly applicable to vehicles with a pivotable rear axle and vehicles in which the pivotable axle is suspended (either dependently or independently).

The oscillation magnitude is typically limited by suitable end-of-stroke stops placed at the location of the front wheels. On average, a rotation of the front axle around the longitudinal axis of the vehicle between +10 degrees and −10 degrees is allowed. Thereby, the total rotational freedom is about 20 degrees.

As a result of the configuration of rigid rear axle and oscillating front axle, the vehicle structure is very similar to that of a three-wheeled vehicle, with two rear and one front resting point, at least for all positions of the front axle for which the limitation to the oscillation of the front axle has not intervened. Thus, the front axle does not contribute in any way to rollover resistance (at least when end-of-stroke stops have not been reached in the oscillation) since it centrally supports the vehicle body.

Stability of the vehicle on sloping ground is critical. Such stability can be negatively influenced by implements connected to the vehicle. This makes it dangerous to drive the vehicle on sloping ground, especially during lifting and transporting of very heavy loads, since there is a great risk of the vehicle overturning. Such overturning generally has severe consequences, which are often mortal for the driver of the vehicle.

EP2444304 proposes a device and a method for increasing the stability of the vehicle, thus reducing the risk of the vehicle overturning in critical working conditions. It discloses a system for preventing overturning comprising at least one actuator, for example a double-acting hydraulic actuator, interposed between the front axle and the body of the vehicle. The actuator is able to exert controllable forces on the front axle in such a manner as to contrast the rotation of the front axle with respect to the body of the vehicle. In EP2444304, rollover is detected using a complex combination of sensors. These sensors typically measure the angular position or angular acceleration of the vehicle. Via the measurements of angular position and/or acceleration, rollover is detected, and in a further step corrected via the actuator.

A drawback of the known anti-rollover system is that angular position sensors or angular acceleration sensors are typically inaccurate when applied to an agricultural vehicle. Namely, an agricultural vehicle in operation generates a substantial amount of high frequency and low frequency vibrations. These vibrations are continuously picked up by the angular position sensor and/or angular acceleration sensor, disturbing the output of these sensors. Thus the sensitivity of the sensors, necessary to correctly detect rollover in an early stage, increases the sensitivity to the disturbance by vehicle vibrations. Although these angular position sensors and/or angular acceleration sensors work very well in a laboratory to detect rollover (in ideal circumstances) in a real life environment, the agricultural vehicles movements and vibrations make rollover detection inaccurate.

It is an object of the present invention to provide an agricultural vehicle with an anti-rollover system that is more accurate.

To this end, the invention proposes a work vehicle having a first pair of wheels mounted to a vehicle body via a fixed axle and a second pair of wheels mounted to said vehicle body via a pivotable axle, the vehicle comprising an anti-rollover system comprising at least two load sensor means mounted at an axle housing near at least two different ones of the first pair of wheels, to measure a downward force borne by the respective wheel, the load sensor means being operationally connected to a processor, wherein the processor is configured to send anti-rollover commands to the anti-rollover system, based on signals received from said at least two load sensor means.

In FIG. 3, a wheel and the adjacent part of the axle housing are shown. Because of its trumpet-like shape, the part of the axle housing close to each wheel is, from here on, called the 'trumpet'. It is to be noted that the invention is, however, not limited to trumpet-shaped axle housings. Load sensor means are known to be both highly accurate and robust. By providing two load sensor means to the agricultural vehicle at trumpets of different wheels thereof, gives an indication on the load that is borne by these wheels. In magnitude, these measured loads provide no significant information regarding rollover (since the magnitude of load borne by the wheels is highly dependent on the implement that is connected to the vehicle and on the working intensity of the vehicle). However, a difference in magnitude indicates a difference in load that is borne by the different wheels, and thereby provides early stability information (before rollover can be sensed, a difference in load magnitude can be detected). Alternatively, the minimum load value is used for determining the stability of the vehicle. When the load value at at least one of the wheels falls below a certain threshold, this may be an indication that there is a significant roll-over risk.

When one load sensor means is placed at the trumpet of the left rear wheel of the agricultural vehicle and another load sensor means is placed in a similar manner near the right rear wheel trumpet of the agricultural vehicle, a comparison is indicative of the left-right vehicle load distribution. A surprising advantage of using load sensor means to detect vehicle stability, instead of using angular position sensors, or angular acceleration sensors, is that before the vehicle start tilting over (whereby the angular position of the vehicle changes), an instability can be detected by an uneven load distribution. This allows an anti-rollover system to act on the vehicle on a much earlier stage when load sensor means are used to measure a vehicle instability.

In a preferred embodiment, the anti-rollover system comprises a pivot control system with at least one actuator extending between the vehicle body and the pivotable axle in such a manner that the actuator is provided to create a torque between the pivotable axle and the vehicle body and wherein said anti-rollover commands comprise at least an actuating signal for said actuator.

By actively pushing the vehicle body away from, or pulling it towards, one of the ends of the pivotable axle, the center of gravity of the vehicle body is moved and the balance may be restored.

Alternatively, the anti-rollover commands may cause and/or prevent braking, accelerating and/or steering of one or more of the wheels in order to improve the vehicle balance. As a further alternative, the center of gravity of the vehicle may be moved relative to the axles by way of adjusting a position of a movable mass.

In most agricultural vehicles, the fixed axle is the rear axle and the front axle is the pivotable one In such a configuration, the load sensor means are preferably provided at least at the rear wheel trumpets, such that the downward force on the rear wheels is indicative of the left-right stability of the vehicle. Providing the load sensors at the rear wheel trumpet provides a load measurement that is indicative of the downward load borne by the rear wheels. Based on this indication, anti-rollover commands can be generated to prevent rollover of the vehicle.

Preferably, the anti-rollover system comprises at least one actuator extending between the vehicle body and the pivotable axle in such a manner that the actuator is provided to push the respective wheel in a direction away from the vehicle frame, wherein said processor is operationally connected to said at least one actuator, and wherein said anti-rollover commands comprise at least an actuating signal to said actuator. By pushing a wheel away from the vehicle frame, the wheel is pushed downward. Thereby, the downward load borne by the wheel is enlarged. Since the total weight of the vehicle remains unchanged, bearing a higher load via a predetermined wheel results in lower loads to be borne by the other wheels. In this manner, the balance of the vehicle can be changed. Thereby rollover can be prevented.

Preferably, a rear pair of wheels of the vehicle is formed by said first pair of wheels and is suspended via the fixed axle in a substantially rigid manner to said vehicle body so that a relative position of said rear pair of wheels with respect to the vehicle body is predetermined, and a front pair of wheels of the vehicle is formed by said second pair of wheels and is suspended via said pivotable axle that is hingingly connected to the vehicle body in such a manner that the front pair of wheels are movable with respect to the body in an upward and downward direction. Agricultural vehicles are generally built with fixed rear wheels and suspended front wheels. Therefore the invention can be applied to such agricultural vehicle by mounting the actuator to the front wheel axles (which are the second pair of wheel supporting arms).

Preferably, the vehicle frame comprises three supporting zones, two supporting zones being located at the rear end of the frame each one at the location of a rear wheel so that each rear wheel supports the vehicle frame at a respective one of the two supporting zones, and a further supporting zone being located centrally at the front end of the frame, wherein the front wheel supporting arms further comprise a supporting element that is hingingly connected to said further supporting zone to be rotatable around an axis that is substantially parallel to a forward driving direction of the agricultural vehicle, wherein the actuator is connected to at least one of the supporting element and the front wheel supporting arms. The configuration of agricultural vehicles is such that its supporting structure is very similar to that of a three-wheeled vehicle. In such configuration, by acting on the front wheel, the central front supporting zone can be virtually shifted to the left or to the right thereby influencing the stability of the vehicle. In this manner, rollover can be prevented.

Preferably, the actuator comprises two single-acting actuators, each actuator being provided to act on a different one of the front wheel trumpets. Alternatively, the actuator is formed as a double-acting hydraulic cylinder. This allows influencing the stability of the agricultural vehicle in two directions (left and right).

Preferably, said actuating signal to said actuator is provided to instruct the actuator to counteract on an imbalance measured between said two load sensor means. By counteracting on a measured imbalance (difference in magnitude between the two load sensor means), the stability is enhanced and thereby rollover is prevented.

Preferably, the processor comprises a comparator for comparing the loads measured by the load sensor means and for determining a difference in measured load. By comparing the sensor outputs of the load sensor means, a difference can be detected which is indicative of a pre-rollover position (wherein the vehicle body starts leaning over to one side, resulting in a higher load on the wheels located at that side).

Preferably, the work vehicle is an agricultural vehicle.

The invention further relates to an anti-rollover system for a work vehicle, the anti-rollover system comprising at least two load sensor means operationally connected to a processor, wherein the processor is configured to send anti-rollover commands to wheels of the work vehicle, based on signals of said at least two load sensor means, wherein the anti-rollover system is adapted to be mounted in a work vehicle to obtain a work vehicle according to the invention. Preferably the anti-rollover commands comprise at least one of braking instructions, acceleration instructions, steering angle instructions and steering axis actuating instructions.

Preferably the system comprises an actuator provided to be mounted between a frame of the work vehicle and a trumpet of a wheel of the work vehicle so that an upward or downward force can be applied to the wheel via the trumpet.

Anti-rollover systems can be built into existing agricultural vehicles, thereby enhancing the stability and preventing rollover of the vehicle.

The invention will now be described in more details with respect to the drawings illustrating some preferred embodiments of the invention. In the drawings.

In the drawings a same reference number has been allocated to a same or analogous element.

Figure 1:
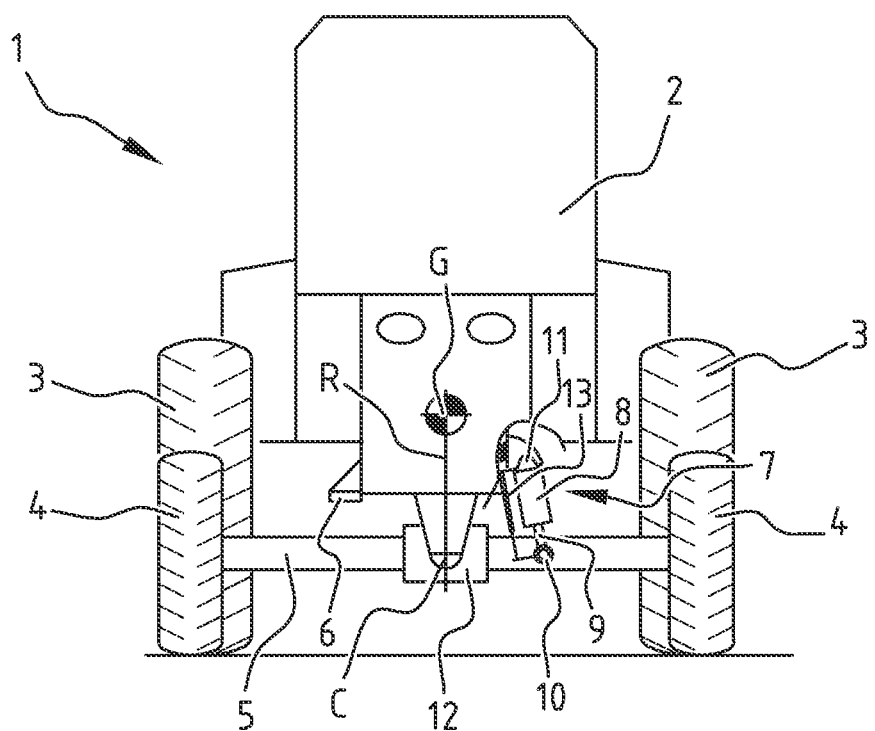
FIG. 1 shows a principle structure of an agricultural vehicle according to an example of the invention.

In the description, trumpet is defined as a part of the axle housing adjacent each wheel. Because of its trumpet-like shape, this part of the axle housing is also called the 'trumpet'. It is to be noted that the invention is, however, not limited to trumpet-shaped axle housings. supporting arm. The trumpet is typically mounted between the vehicle body and the wheel. The trumpet is typically a supporting element in which the driving or driven shaft is borne via roller bearings.

Agricultural vehicles 1 are designed to be used on a rough terrain. A rough terrain is a terrain with an uneven ground surface and/or unstable ground surface. An unstable ground surface is typically the result of fluid, semi-fluid or viscous ground surface materials such as dirt, sand or similar materials. An agricultural vehicle is provided with large wheels compared to regular vehicles, so that the agricultural vehicle can move well on these rough terrains.

On these rough terrains, as a result of uneven ground surfaces, rollover of an agricultural vehicle is a known risk. To prevent an agricultural vehicle from rolling-over, the track width of the vehicle, determined by the distance between left vehicle wheels and right vehicle wheels is enlarged compared to regular vehicles. However in extreme circumstances, this adaptation might not be enough to prevent rollover. It is an object of the present invention to provide an agricultural vehicle with a high rollover resistance.

The vehicle 1 comprises a body 2 to which a pair of rear wheels 3 are connected. The rear wheels 3 are powered by the engine of the vehicle via a rear driving shaft (not shown) connecting the wheels 3 with the body 2 in a substantially rigid manner (meaning with no significant suspension means between the wheel and the body). The vehicle 1 is further provided with a pair of front wheels 4 connected to the body 2 of the vehicle via a front axle 5. The front axle is hingingly connected to the vehicle body thereby enabling the front axle 5 to oscillate with respect to the body 2 around a longitudinal axis of the vehicle, being an axis that is substantially parallel to the straight moving direction of the vehicle. The oscillation movement of the front axle 5 with respect to the body 2 is limited by stop elements 6.

Starting from the general principle that a resting body remains in a stable equilibrium if the resultant of the forces acting thereon is directed to the rest and meets the resting surface inside the resting polygon. In the case of a vehicle 1, if the vehicle is subject to the single or combined effects of centrifugal forces (due to curved trajectories), of lateral and/or longitudinal slopes, and of external forces, the reactions of resting on the ground of the single wheels will be reconfigured as constraints for re-establishing equilibrium. A combination of these effects might in certain circumstances result in a rear wheel lifting up from the ground (prelude to rollover).

It should be noted that, at least until the front axle 5 does not reach the oscillation end-of-stroke limits defined by the stop elements 6, the stability of the vehicle, in terms of lateral overturning (rollover), is ensured only by the rear wheels 3. Namely the hingingly connected front axle 5 provides no resistance against lateral roll (due to the hinge).

If the rear wheels 3 rest on a tilted and/or unstable ground surface, the body 2 of the vehicle 1 might rotate with respect to the front axle 5 around the hinge connection C. This rotation may cause one of the rear wheels to lift up from the ground. By lifting of one of the rear wheels, the resting triangle (three-wheeled vehicle) degenerates in a resting straight line. Through the effect of the rotation of the body 2 of the vehicle 1 with respect to the front axle 5 and of the lifting of the rear wheel 3, the centre of gravity G of the vehicle rotates around an axis coinciding with said straight line. Through the effect of said rotation, the centre of gravity G rises and, simultaneously, moves towards said straight line (being an edge of the resting triangle). When the center of gravity passes the resting straight line, i.e. exits from the resting triangle, the vehicle 1 overturns.

The rollover dynamics of the vehicle 1 are nevertheless influenced by the fact that the oscillation of the front axle 5 with respect to the body 2 is limited to a predetermined angle (by the stop elements 6). When the stop elements 6 come into contact with the front axle 5 (when the stop elements are mounted on the vehicle body as is shown in the figure) or with the vehicle body (when the stop elements are mounted on the front axle as is not shown in the figure), further rotation of the body 2 of the vehicle 1 with respect to the front axle 5 is prevented. Typically, this occurs before the center of gravity passes the resting straight line, i.e. before the vehicle 1 has reached limit balance condition.

When the stop elements 6 prevent further rotation of the front axle 5, the latter becomes a supporting point to the body 2 of the vehicle 1. As a result, the resting triangle is reconfigured since the earlier central front supporting zone is shifted towards the location of the stop element. The balance of the vehicle will thus be ensured up to the moment that the center of gravity exceeds the newly defined resting triangle. Thus apparently the stop elements 6 seem to be able to prevent overturning of the vehicle. Nevertheless, it must be considered that rotation of the body 2 of the vehicle 1 with respect to the front axle 5 is a dynamic phenomenon. This means that when the stop elements come into contact with the front axle 5, locking the rotation of the body 2 of the vehicle 1 with respect to said front axle 5, the inertia forces acting on the vehicle can continue the side rotation of the vehicle, still causing overturning of the vehicle 1.

The anti-rollover system of the invention comprises at least two load sensor means that are mounted at the location of different wheels of the agricultural vehicle 1. Preferably, the anti-rollover system comprises a load sensor near each of the four wheels 3, 4 of the agricultural vehicle. In this manner, a downward load borne by each wheel can be measured and used to determine the stability of the vehicle. Different load measurement means and configurations can be used to form the load sensor means useable in the invention. The load sensor means useable in the invention is at least suitable for, and mounted at the location of a wheel of the agricultural vehicle in such a manner that a load is measured that gives an indication of the downward load that is borne by the respective wheel. The load sensor means can comprise multiple individual load sensors, for example one mounted at the upper side and another at the lower side of the trumpet of the agricultural vehicle to thereby enhance the measured results.

FIG. 2 shows the effect of the anti-rollover system according to an embodiment of the invention. In the figure, the front wheels and rear wheels of an agricultural vehicle 1 are shown. Thereby, the agricultural vehicle has a configuration wherein the rear wheels 3 are connected substantially rigid to the vehicle frame. The front wheels 4 are hingingly connected to the frame such that the front wheels axle 5 can oscillate with respect to the vehicle frame. Therefore, without actuator acting on the front axle 5, and without the front axle 5 reaching or touching the stop elements, the load division between the two front wheels is always 50-50 (meaning that the wheels bear an equal load).

Figure 2A:
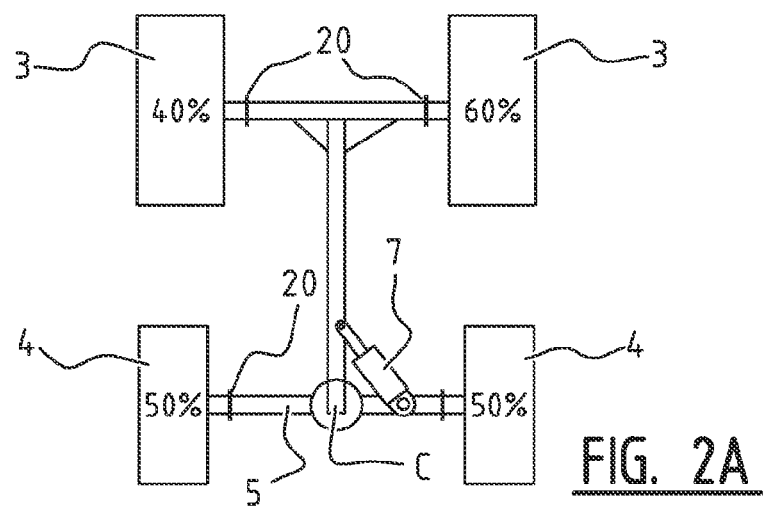
FIG. 2 illustrates the effect of an intervention of the anti-rollover system of the invention.

FIG. 2A shows a situation where the agricultural vehicle is in a stable position. The rear wheels show how the load at the rear end of the agricultural vehicle is substantially equally divided between left and right (being a 40-60 division). In such situation, the agricultural vehicle stand stable and there is low risk of turnover.

Figure 2B:
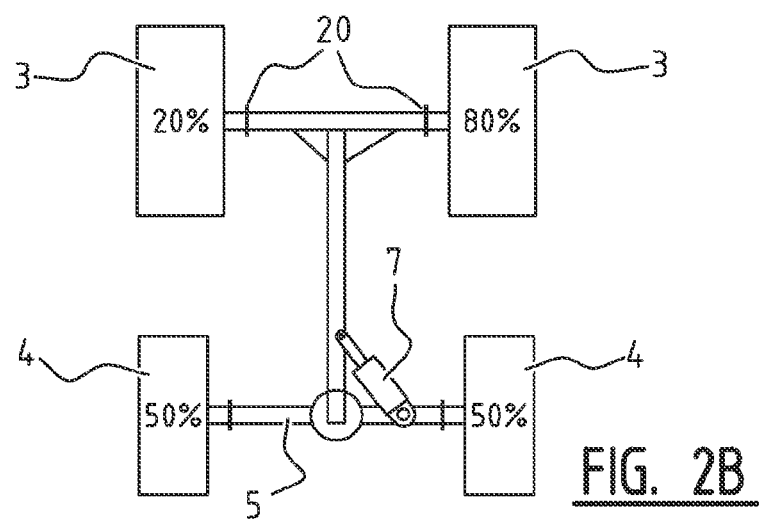

FIG. 2B shows a situation where there is a substantial difference in load borne by the left and right rear wheels. In the example, the left rear wheel (on the right-hand side of the figure) bears 80% of the load while the right rear wheel bears only 20% of the load. Such situation might occur when the agricultural vehicle is placed on a laterally steep underground. Such load division indicates that there is a high risk of rollover. In such situation, the load division of the front wheels is substantially equal to 50-50. The reason for this is that the front wheels are hingingly connected to the vehicle frame, able to oscillate around hinge point C. An unequal load division between the two front wheels would result in the front wheel axle 5 hinging towards a new balance point (where the load is equally divided). This process continues as long as the front wheel axle 5 can freely rotate. As a result, the stability of the agricultural vehicle is only determined by the rear wheels.

Figure 2C:
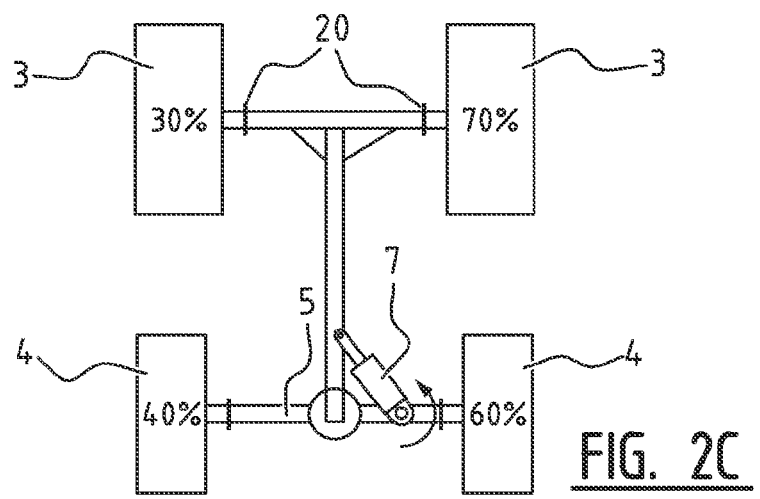

FIG. 2C shows a situation wherein the anti-rollover system of the present invention is activated. The starting situation is the situation shown in FIG. 2B. Thus in FIG. 2C, the same environmental and external conditions apply to the agricultural vehicle as in FIG. 2B. The anti-rollover system detects the difference in load measured between the two rear wheels (80-20) and activates the pivot control system 7 to compensate the unbalance. Alternatively, the minimum load value is used for determining the stability of the vehicle. When the load value at at least one of the wheels falls below a certain threshold, this may be an indication that there is a significant roll-over risk. When a roll-over risk is detected, the actuator 8 applies a force to the front axle 5 to push the left front wheel (shown on the right hand side of the figure) downward, away from the vehicle frame. As a result of the force applied, the equal load distribution between the front wheels is shifted towards the actuated wheel. FIG. 2C shows how the load is divided 60-40 between the front wheels because the actuator is activated. As a result, the load difference between the rear wheels is (at least partially) compensated and brought back to a 70-30 division. This will bring the agricultural vehicle back into a more stable position thereby preventing rollover of the vehicle. In this regard, it is noted that rollover can only be detected by angular sensors once a rear wheel loses contact with the ground surface. According to the present invention, rollover can be detected at a very early stage, when stability of the agricultural vehicle decreases.

The anti-rollover system comprises at least one actuator 8, for example a double-acting hydraulic actuator, interposed between the front axle 5 and the body of the vehicle. The actuator is able to exert controllable forces on the front axle in such a manner as to counteract on the rotation of the front axle with respect to the body of the vehicle. The actuator typically comprises an actuator body 8, connected to the body 2 of the vehicle 1 by a first rotating connection 11, and a stem 9 connected to the front axle 5 via a second rotating connection 10.

The stability of the vehicle 1 can be increased by limiting movement of the centre of gravity G of the vehicle 1 to the resting polygon on the ground (preferably before the stop elements 6 come into contact with the front axle 5) Thereby, the risk of overturning of the vehicle can be substantially reduced.

The anti-rollover system comprises at least one actuator 8, for example a double-acting hydraulic actuator, interposed between the front axle 5 and the body 2 of the vehicle 1. The actuator 8 comprises an actuator body, connected to the body 2 of the vehicle 1 by a first rotating connection 11, and a stem 9 connected to the front axle 5 via a second rotating connection 10. The actuator 8 is able, according to a first intervention mode, to exert controllable forces on the front axle 5 in such a manner as to counteract the rotation of the front axle 5 with respect to the body 2 of the vehicle 1.

The actuator 8 can be provided to operate according to a second intervention mode, depending on the overturning risk conditions. In such mode, the actuator is suitable for locking the front axle 5 in a predetermined angular position with respect to the body 2 of the vehicle 1, and thus fixing the position of the front wheels 4 with respect to said body 2.

The first or the second intervention mode are selectable by the system based on different input factors.

The maximum stroke of the stem 9 of the actuator 8 is dimensioned in such a manner as not to limit the maximum angle of oscillation of the front axle 5. Further, in conditions of normal operating stability of the vehicle 1, the actuator 8 is configured not to oppose significant resistance to the oscillation of the front axle 5. If an additional actuator is used to push on and/or pull at the other end of the pivotable axle 5, the actuators 8 may additionally be used as part of a suspension system for damping oscillations of the pivotable axle 5. The two actuators 8 may be hydraulically coupled to each other.

It should be noted that the dual-action actuator device 8 can be replaced by two single-action actuator devices, connected to the body 2 of the vehicle and to the front axle 5 on opposite sides with respect to the central axis of the vehicle 1. In this case, when the risk of overturning occurs, the system according to the invention activates the actuator located on the side where the overturning risk exists. The force applied to the front axle 5 by the single-action actuator devices is always directed towards the front axle 5. Also the two single-action actuator devices may simultaneously be part of a suspension system for a suspended pivotable axle and may or may not be hydraulically coupled to each other.

It is to be noted that the anti-rollover system described above can also be used with independently suspended pivotable axles in which the left and right ends of the pivotable axle can make different angles with the vehicle body 2.

Figure 3:
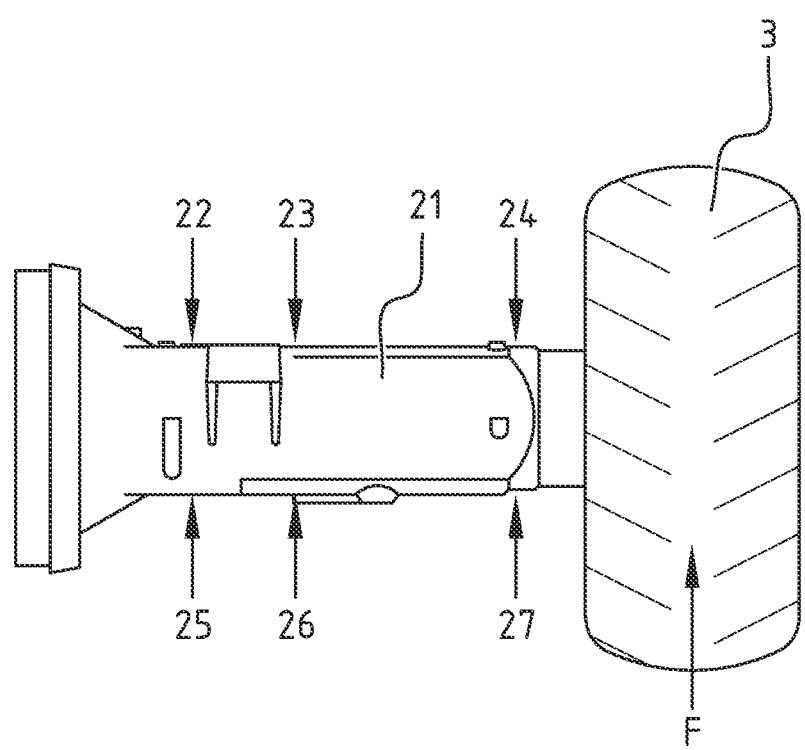
FIG. 3 shows an example of a load sensor that can be used in the invention.

FIG. 3 shows an example of a load sensor 20 placed at the location of a rear wheel 3. It will be clear that in a similar manner, a load sensor can be placed at the location of a front wheel 4. The load sensor 20 according to the example of FIG. 3 comprises multiple (a total of six) strain gauges 22, 23, 24, 25, 26 and 27. The strain gauges are mounted to the upper side and to the lower side of the supporting arm 21 of the rear wheel 3. Essentially only one strain gauge is sufficient to get an indication of the load borne by the wheel 3. For more accurate results, two strain gauges are provided symmetrically with respect to the axle axis, one on the upper side and one on the lower side of the axle. When multiple strain gauges are placed at different distances from the wheel, it is possible to extract the downward force F from the results of the load measurement without requiring any additional information.

Advantageously, the work vehicle 1 further comprises an inclination sensor (not shown) provided for measuring the angular position of the work vehicle. The inclination sensor can be used for deriving the vertical component from the total load measured by the load sensors. The output of the inclination sensor is operationally connected to the processor. The processor can also take the results of the inclination sensor into account when anti-rollover instructions are generated. Preferably, the actuator is only instructed to act on the front shaft when the imbalance measured by the load sensors is oriented in the same direction as the inclination measured by the inclination sensor. For example when the load at the right side of the work vehicle is 70% of the total load and the work vehicle inclines to the right, then the actuator is instructed to act on the front shaft to counter the measured imbalance.

The example of FIG. 3 proved to be very useful in extracting the downward force F from the loads measured by the strain gauges. The six strain gauges 22, 23, 24, 25, 26 and 27 according to the example are mounted symmetrical with respect to the axle, three at the upper side and three at the lower side of the axle (in the further explanation referred to as three pairs of strain gauges). One pair of strain gauges 24, 27 is located close to the wheel 3 mounting surface. A second pair 23, 26 of strain gauges is located at one side and close to a lateral mounting zone 28 (lateral with respect to the axle direction) of the axle. A third pair 22, 25 of strain gauges is located at the other side and close to the lateral mounting zone 28 of the axle. Thereby, preferably the distance between the center of the lateral mounting zone 28 and the second pair of strain gauges 23, 26 is substantially equal to the distance between the center of the lateral mounting zone 28 and the third pair of strain gauges 22, 25. This allows the second pair and third pair of strain gauges to eliminate the impact of the lateral force applied to the axle from the measurements. Preferably the distance between the first and second pair of strain gauges is different from the distance between the second and third pair of strain gauges and is furthermore different from the distance between the first and third pair of strain gauges. This allows eliminating lateral forces applied to the wheel 3.

It is further advantageous to enable the system for preventing overturning according to the invention, such that it is able to be driven manually by the driver of the vehicle, who manually commands and adjusts the actuator 8 by a suitable driving device that is manually activatable and provided in the driver cab. Manual driving of the system for preventing overturning according to the invention is useful, for preventive purposes, in the case of travelling on inclined ground that is inclined transversely to the movement direction, the system in all cases activating automatically in the case of a high or extremely high overturning risk. Further, the system for preventing overturning according to the invention can be used for auxiliary services, such as lifting a wheel, for example to replace the wheel in the event of a puncture or for maintenance.

The invention claimed is:

1. A work vehicle having a first pair of wheels mounted to a vehicle body via a fixed axle and a second pair of wheels mounted to the vehicle body via a pivotable axle, the work vehicle comprising an anti-rollover system comprising at least two load sensors mounted at an axle housing near different ones of the first pair of wheels to measure a downward force borne by each respective wheel of the first pair of wheels, the at least two load sensors being operationally connected to a processor, wherein the processor is configured to send anti-rollover commands to the anti-rollover system based on signals received from the at least two load sensors, wherein the anti-rollover system comprises a pivot control system with at least one actuator that extends from the vehicle body at a first end to the pivotable axle at a second end, the at least one actuator is configured to create a torque about a longitudinal axis between the pivotable axle and the vehicle body, and the anti-rollover commands comprise at least an actuating signal to the at least one actuator.

2. The work vehicle according to claim 1, wherein the at least one actuator comprises two single-acting actuators, each single-acting actuator being provided to act on a different end of the pivotable axle.

3. The work vehicle according to claim 1, wherein the at least one actuator is formed as at least one double-acting hydraulic cylinder.

4. The work vehicle according to claim 1, wherein the fixed axle is a rear axle and the pivotable axle is a front axle of the work vehicle.

5. The work vehicle according to claim 1, wherein the pivotable axle is a suspended axle.

6. The work vehicle according to claim 1, wherein the processor is configured to send the anti-rollover commands to a braking system, wheel drive system, or steering system.

7. The work vehicle according to claim 1, wherein the actuating signal for the at least one actuator is provided to instruct the at least one actuator to counteract an imbalance measured between the at least two load sensors.

8. The work vehicle according to claim 1, wherein the processor comprises a comparator configured to compare loads measured by the at least two load sensors and to determine a difference in the loads.

9. The work vehicle according to claim 1, wherein the work vehicle is an agricultural vehicle.

10. The anti-rollover system according to claim 1 for use in the work vehicle.

11. A pivot control system with at least one actuator that extends from a vehicle body at a first end to a pivotable axle at a second end, wherein the at least one actuator is configured to create a torque about a longitudinal axis between the pivotable axle and the vehicle body, and a processor configured to send an actuating signal to the at least one actuator based on signals received from at least two load sensors.

12. At least one tangible, non-transitory, machine-readable medium, comprising machine-readable instructions to:
   measure, via at least two load sensors mounted at an axle housing near different ones of a first pair of wheels, a downward force borne by each respective wheel of the first pair of wheels;
   generate anti-rollover commands based on signals received from the at least two load sensors; and
   send the anti-rollover commands to an anti-rollover system having at least one actuator coupled to a pivotable axle at a first end and a vehicle body of the work vehicle at a second end, wherein the anti-rollover commands are configured to cause the at least one actuator to create a torque about a longitudinal axis between the pivotable axle and the vehicle body.

* * * * *